United States Patent
Choi et al.

(10) Patent No.: US 8,159,183 B2
(45) Date of Patent: Apr. 17, 2012

(54) CONTACT-LESS POWER SUPPLY, CONTACT-LESS CHARGER SYSTEMS AND METHOD FOR CHARGING RECHARGEABLE BATTERY CELL

(75) Inventors: Sung-Uk Choi, Anyang-si (KR); Kwang-Hee Kwon, Anyang-si (KR); Jung-Bum Kim, Seoul (KR); Sung-Wook Moon, Seoul (KR); Dong-Young Park, Anyang-si (KR); Sub Han, Seoul (KR)

(73) Assignee: LS Cable & System Ltd., Anyang-si, Gyeonggi-do (KR)

( * ) Notice: Subject to any disclaimer, the term of this patent is extended or adjusted under 35 U.S.C. 154(b) by 837 days.

(21) Appl. No.: 12/162,971

(22) PCT Filed: Jan. 23, 2007

(86) PCT No.: PCT/KR2007/000392
§ 371 (c)(1), (2), (4) Date: Jul. 31, 2008

(87) PCT Pub. No.: WO2007/089086
PCT Pub. Date: Aug. 9, 2007

(65) Prior Publication Data
US 2009/0033280 A1    Feb. 5, 2009

(30) Foreign Application Priority Data
Jan. 31, 2006  (KR) ................. 10-2006-0009304

(51) Int. Cl.
*H02J 7/00*    (2006.01)

(52) U.S. Cl. ......... 320/108; 320/106; 320/112; 320/114
(58) Field of Classification Search ................. 320/108, 320/106, 112–114
See application file for complete search history.

(56) References Cited

U.S. PATENT DOCUMENTS

| | | | |
|---|---|---|---|
| 6,316,909 B1 | 11/2001 | Honda et al. | |
| 7,233,137 B2 | 6/2007 | Nakamura et al. | |
| 2003/0210106 A1 | 11/2003 | Cheng et al. | |
| 2004/0145342 A1* | 7/2004 | Lyon ............................ | 320/108 |
| 2005/0189910 A1* | 9/2005 | Hui ............................. | 320/108 |

(Continued)

FOREIGN PATENT DOCUMENTS
GB    2 314 470 A    12/1997
(Continued)

OTHER PUBLICATIONS

International Search Report and Written Opinion of the International Searching Authority for International Application No. PCT/KR2007/000392 dated May 5, 2007.

*Primary Examiner* — Edward Tso
*Assistant Examiner* — Samuel Berhanu
(74) *Attorney, Agent, or Firm* — Sherr & Vaughn, PLLC (57) ABSTRACT

The present invention relates to a contact-less power supply magnetically coupled to a battery device having a receiving coil therein, for contact-less charging the battery device, the contact-less power supply having a sending coil array including a plurality of sending coils for inducing a charging power to the receiving coil; and a driving means for detecting a sending coil magnetically coupled to the receiving coil and selectively driving only the detected sending coil.

6 Claims, 7 Drawing Sheets

U.S. PATENT DOCUMENTS

2006/0176015 A1 * 8/2006 Bersenev .................. 320/114

FOREIGN PATENT DOCUMENTS

| | | |
|---|---|---|
| JP | 09-233706 | 9/1997 |
| JP | 2001-258182 | 9/2001 |
| JP | 2002-209344 | 7/2002 |
| JP | 2003-224937 | 8/2003 |
| JP | 2005-006440 | 1/2005 |
| JP | 2005-110412 | 4/2005 |
| KR | 20-0217303 | 1/2001 |
| KR | 10-2001-0048695 | 6/2001 |
| KR | 10-2002-0025342 | 4/2002 |
| KR | 10-2002-0035242 | 5/2002 |
| KR | 10-2002-0057468 | 7/2002 |
| KR | 10-2002-0057469 | 7/2002 |
| KR | 10-2003-0045305 | 6/2003 |
| KR | 10-2003-0072999 | 9/2003 |
| KR | 10-2005-0096068 | 10/2005 |
| KR | 10-2006-0006872 | 1/2006 |

* cited by examiner

CONTACT-LESS POWER SUPPLY, CONTACT-LESS CHARGER SYSTEMS AND METHOD FOR CHARGING RECHARGEABLE BATTERY CELL

CROSS-REFERENCE TO RELATED APPLICATIONS

This application is a national stage application under 35 U.S.C. 371 based on and claiming the benefit of International Application Serial No. PCT/KR2007/000392 filed on Jan. 23, 2007 and the benefit of priority from Korean Application No. 10-2006-0009304filed on Jan. 31, 2006, the entire contents of each of which are incorporated herein by reference.

TECHNICAL FIELD

The present invention relates to a power supply for a portable electronic equipment, and in particular, to a contact-less charger system using inductive coupling.

BACKGROUND ART

A rechargeable secondary electric cell (i.e. a battery) is mounted in a portable electronic equipment such as a mobile communication terminal, a PDA and so on. To charge the secondary electric cell (i.e. battery), it requires a separate power supply for supplying electric energy to the battery of the portable electronic equipment using a commercial power source for domestic use. Typically, each of the power supply and the battery has a separate external contact terminal, and thus the power supply is electrically connected to the battery by connecting to the two contact terminals.

However, if the contact terminals protrude outward, this leads to bad appearance and the contact terminals are contaminated by external impurities, resulting in poor contact state. And, if the battery is disconnected or exposed to moisture due to a user's carelessness, the battery is apt to lose the charging energy.

To solve a contact-type charging method, a wireless charger system has been suggested, which charges a power supply and a battery in a contact-less manner.

Prior arts teach contact-less charger systems, which charge a battery using inductive coupling between a primary coil of a charging body and a secondary coil of a battery pack without contact terminals, as disclosed in Korean Laid-open Patent Publication No. 2002-57468, Korean Laid-open Patent Publication No. 2002-57469, Korean Patent Registration No. 363,439, Korean Patent Registration No. 428,713, Korean Laid-open Patent Publication No. 2002-35242, Korean Utility Model Registration No. 217,303, U.K. Laid-open Patent Publication No. 2314470, U.S. Laid-open Patent Publication No. 2003/0210106, Japanese Laid-open Patent Publication No. 2002-209344, Japanese Laid-open Patent Publication H9-233706, Japanese Laid-open Patent Publication No. 2001-258182, and U.S. Pat. No. 6,316,909.

However, the above-mentioned conventional contact-less charger systems have a disadvantage that the charging efficiency depends on the positional relationship between the primary coil and the secondary coil. That is, in case positional offset exists between the primary coil and the secondary coil, induced electromotive force is insufficiently induced to the secondary coil, and thus the contact-less charger system has lower charging efficiency than a contact-type charger system. Therefore, the user should arrange the portable electronic equipment or the battery pack having the secondary coil therein at an optimal position on the charging body.

To solve the problem, attempts have been made to change the arrangement pattern of the primary coil for securing high charging efficiency regardless of location or orientation of the secondary coil.

Korean Patent Registration No. 524,254 (hereinafter referred to as 254' patent) discloses a contact-less charger system, in which a flat core is formed by connecting a plurality of small-sized cores made of cobalt-based or ferrite materials, and a core block is formed by winding a predetermined pattern of coil on the flat core and mounted in a wireless charging pad (a primary charging body).

The above 254' patent arranges a plurality of coils alternately or parallel on the same plane of the charging body to compensate for positional offset between a primary coil and a secondary coil, which results in excessive waste of energy, compared with a contact-less charger system using a single coil.

DISCLOSURE OF INVENTION

Technical Problem

It is an object of the present invention to provide a contact-less power supply which effectively transmits induced electromotive force to a secondary battery device regardless of positional relationship between a primary coil and a secondary coil.

And, it is another object of the present invention to provide a contact-less power supply which simultaneously charges a plurality of portable electronic equipments.

And, it is another object of the present invention to provide a contact-less power supply which realizes high charging efficiency and minimizes waste of energy.

Technical Solution

In order to achieve the above-mentioned objects, a contact-less power supply in accordance with a first aspect of the present invention magnetically coupled to a battery device having a receiving coil therein, for contact-less charging the battery device, has a sending coil array including a plurality of sending coils for inducing a charging power to the receiving coil; and a driving means for detecting a sending coil magnetically coupled to the receiving coil and selectively driving only the detected sending coil.

At this time, the driving means selects only a sending coil having a feedback response from the battery device. Particularly, the driving means determines whether a feedback response exists from the battery device within a predetermined time while sequentially driving the sending coils of the sending coil array, and selects only a sending coil having the feedback response from the battery device within a pre-determined time, or the driving means selects only a sending coil having a feedback response from the battery device within a predetermined time while simultaneously driving all of the sending coils of the sending coil array.

And, a charging power supply system in accordance with a second aspect of the present invention, magnetically coupled to a battery device including a secondary coil for inductive coupling, a wireless sending module for wirelessly sending data, a charge controlling circuit for controlling the charging state of the battery device, and a rechargeable battery, has a primary coil array including a plurality of primary coils for inducing a charging power to the secondary coil; a rectifier circuit for converting the external alternating current voltage to direct current voltage; a coil driving circuit for generating a driving power to drive the primary coil based on the direct current voltage; a wireless receiving module for receiving a feedback signal from the wireless sending module; and a drive controlling circuit for controlling the coil driving circuit to preliminarily drive the primary coils, selecting only a primary coil having the feedback response from the battery device according to the preliminary drive of the primary coil, and driving only the selected primary coil thereby to charge the battery device.

At this time, the drive controlling circuit determines whether the feedback response exists from the battery device within a predetermined time while preliminarily driving sequentially the primary coils, and selects only a primary coil having the feedback response from the battery device within a predetermined time, or the drive controlling circuit selects only a primary coil having feedback response from the batter device within a predetermined time while preliminarily driving simultaneously all of the primary coils.

And, the primary coil array includes a plurality of the primary coils arranged in a matrix pattern or in a zigzag pattern.

A charging method for charging a battery in accordance with a third aspect of the present invention, in a contact-less charger system composed of a power supply including a primary coil array having a plurality of primary coils and a wireless receiving module, and a battery device having a secondary coil magnetically coupled to the primary coil, a wireless sending module and a rechargeable battery, includes (A) selecting any one of the primary coils and preliminarily driving the selected primary coil during a relatively short time; (B) waiting for a feedback response from the battery device during a predetermined time; (C) in case the feedback response exists, temporarily storing identification information of the corresponding primary coil in a memory; (D) selecting another primary coil from the primary coil array and repetitively performing the steps (A) to (C); (E) sequentially performing the step (D) on all of the primary coils of the primary coil array; and (F) reading the identification information of the primary coil from the internal memory and selectively supplying a charging power to only the corresponding primary coil.

And, a charging method for charging a battery in accordance with a fourth aspect of the present invention, in a contact-less charger system composed of a power supply including a primary coil array having a plurality of primary coils and a wireless receiving module, and a battery device having a secondary coil magnetically coupled to the first coil, a wireless sending module and a battery, includes (A) preliminarily driving sequentially the primary coils during a relatively short time; (B) waiting for a feedback response from the battery device during a predetermined time; (C) selecting at least one primary coil having the feedback response; and (D) charging the battery device by applying a charging power to the selected primary coil.

And, a charging method for charging a battery in accordance with a fifth aspect of the present invention, in a contact-less charger system composed of a power supply including a primary coil array having a plurality of primary coils and a wireless receiving module, and a battery device having a second coil magnetically coupled to the first coil, a wireless sending module and a battery, includes (A) preliminary driving simultaneously all of the primary coils of the primary coil array during a relatively short time; (B) waiting for a feedback response from the battery device during a pre-determined time; (C) selecting at least one primary coil having the feedback response; and (D) charging the battery device by applying a charging power to the selected primary coil.

And, a contact-less charger system in accordance with a sixth aspect of the present invention including a primary coil array composed of a plurality of primary coils; a first charging unit having a wireless receiving module; a second charging unit having a secondary coil magnetically coupled to the primary coil and a wireless sending module; and a battery supplied a charging power from the second charging unit, wherein the first charging unit includes the primary coil array having a plurality of the primary coils for inducing the charging power to the secondary coil; and means for selecting a primary coil having the feedback response from the second charging unit after driving the primary coils in a waiting mode, and driving only the selected primary coil in a charging mode and, the second charging unit includes means for generating a feedback signal informing the start of charging in case that a power sufficient to drive an internal circuit is induced to the second coil, and transmitting the feedback signal to the first charging unit.

BRIEF DESCRIPTION OF THE DRAWINGS

The present invention will be more fully described in the following detailed description, taken accompanying drawings, however, the description proposed herein is just a preferable example for the purpose of illustrations, not intended to limit the scope of the invention. In the drawings.

BEST MODE FOR CARRYING OUT THE INVENTION

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
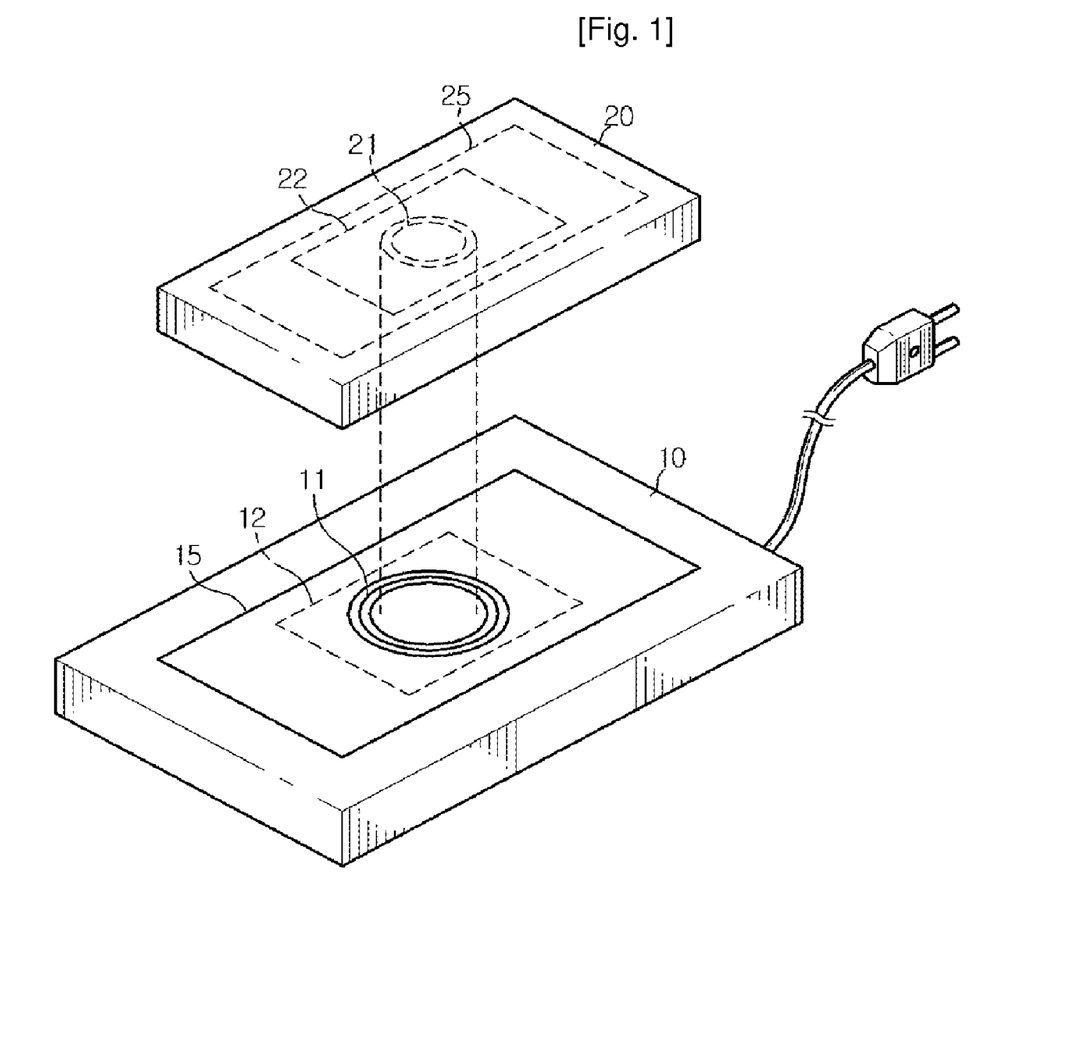
FIG. 1 is a schematic perspective view of a conventional contact-less charger system.

FIG. 1 is a schematic perspective view of a conventional contact-less charger system for describing a contact-less charging principle using an electromagnetic induction phenomenon.

As shown in drawing, the contact-less charger system includes a power supply 10 for generating a charging power for supplying to a battery using an external power, and a battery device 20 supplied with the charging power from the power supply 10 in a contact-less manner and charging the internal battery (not shown) using the charging power.

The battery device 20 includes a battery pack having a battery therein or a portable electronic equipment having a battery therein. Preferably, the portable electronic equipment includes a cellular phone, a PDA, an MP3 player and so on. The battery in the battery device 20 is a rechargeable electric cell including a lithium ion electric cell or a lithium polymer electric cell.

The power supply 10 is supplied with electric energy from the external power and generates the charging power for supplying to the battery device 20, and is preferably formed of a pad type so that the battery device 20 is easily mounted thereon. And, the external power supplied to the power supply 10 preferably uses a commercial alternating current power (for example, 60 Hz, 220V/100V) for domestic use, but a direct current power can be applied.

The power supply 10 has a primary coil 11 and an antenna 12, and the battery device 20 has a secondary coil 21 corresponding to the primary coil 11 of the power supply 10 and an antenna 22 corresponding to the antenna 12 of the power supply 10.

The primary coil 11 is magnetically coupled to the secondary coil 21 by inductive coupling. Accordingly, the secondary coil is juxtaposed on the primary coil, and thus a magnetic field generated by the primary coil induces an induced current into the secondary coil. And, the primary coil 11 and the secondary coil 21 are surrounded by the antennas 12 and 22, respectively.

And, the power supply 10 has a charging power supply circuit 15 therein for driving the primary coil 11 to generate a magnetic field, and the battery device 20 has a charging circuit 25 therein for charging the battery using the induced electromotive force induced by the secondary coil 21.

FIGS. 2a and 2b are use state views of a power supply in accordance with the present invention.

Referring to FIG. 2a, a power supply 100 of the present invention does not have a single coil in a charging pad like the power supply 100 of FIG. 1, but instead has a coil array including a plurality of coils 11. And, the coil array 110 is surrounded by an antenna coil 120. A single antenna coil 120 may be formed so as to the whole coil array 110 or a plurality of antenna coils 120 may be formed so as to surround, for example four to six primary coils.

As such, the coil array 110 including a plurality of the coils achieves the positional conformation between a primary coil and a secondary coil more easily than a coil array including a single coil. As shown in FIG. 2a, even though a battery device 200 is arranged slantingly at any position on the power supply 100, positional offset between the primary coil and the secondary coil does not occur. That is, although the battery device 200 is arranged at any desired position on the power supply 100, there exists at least one primary coil conformable in position to the secondary coil arranged in the battery device 100.

Thus, with the power supply of the present invention, a user doesn't need to consciously consider the positional relationship between the primary coil and the secondary coil, thereby improving the convenience of use. And, the coil array 110 of the present invention may include a plurality of coils formed in a matrix pattern as shown in FIG. 2a or include a plurality of coils arranged, i.e. formed in a zigzag pattern as shown in FIG. 2b.

Figure 3:
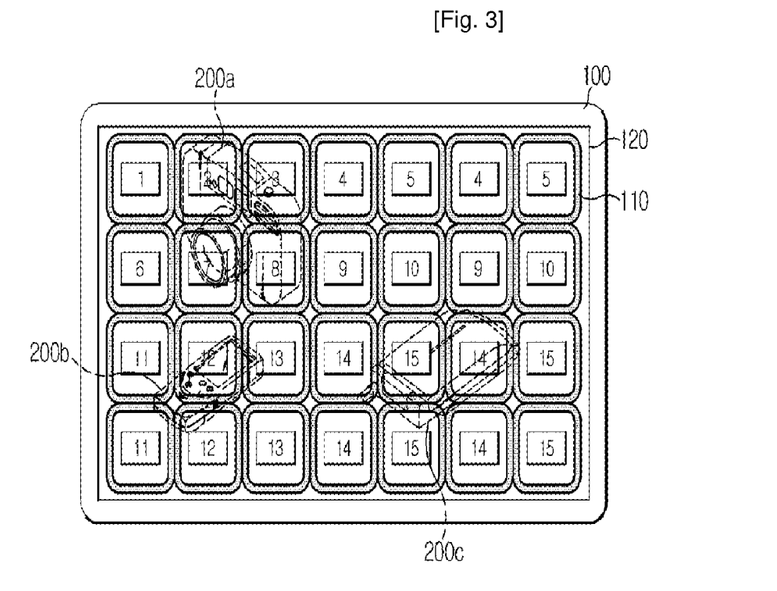
FIG. 3 is another use state view of a contact-less power supply in accordance with a preferred embodiment of the present invention.

FIG. 3 is another user state view of a power supply in accordance with the present invention.

Referring to FIG. 3, at least one battery devices 200a, 200b and 200c are arranged on the power supply 100 having the coil array 110. Thus, the power supply 100 of the present invention has an advantage of simultaneously charging a plurality of the battery devices 200a, 200b and 200c.

Figure 2:
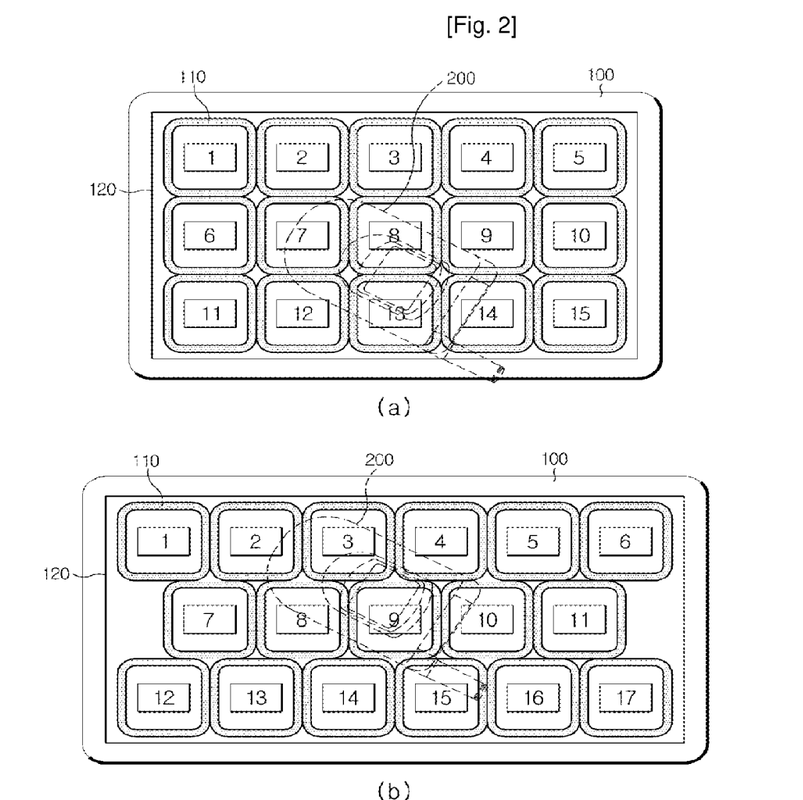
FIGS. 2a and 2b are use state views of a contact-less power supply in accordance with a preferred embodiment of the present invention.

However, the power supply 100 shown in FIGS. 2 and 3 has advantages of securing stable charging efficiency regardless of the positional relationship between the primary coil and the secondary coil and simultaneously charging a plurality of battery devices, but has a disadvantage of excessive energy consumption.

Therefore, the inventors found that energy consumption is remarkably reduced by driving only a primary coil of which at least a portion is coupled to a battery device, among a plurality of primary coils.

The preferred embodiment of the power supply in accordance with the present invention will be hereinafter described in detail with regard to FIGS. 4 and 5.

Figure 4:
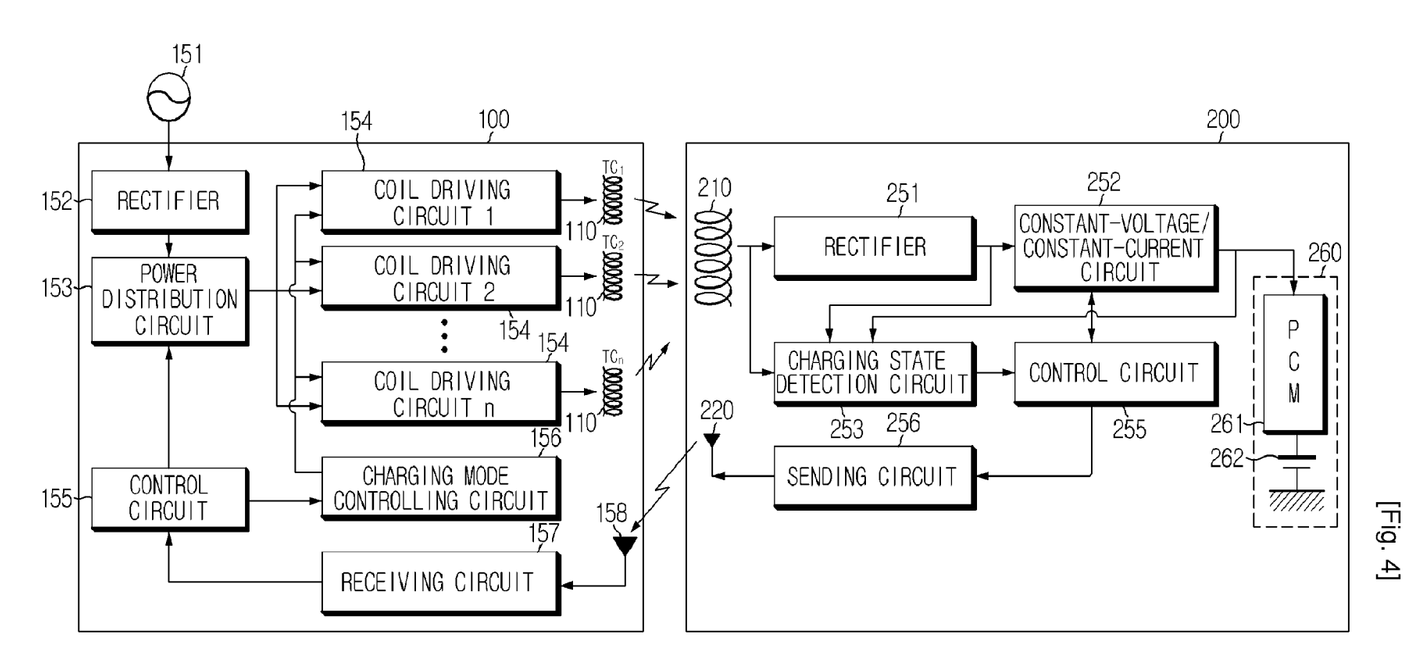
FIG. 4 is a functional block diagram of a contact-less charger system in accordance with a preferred embodiment of the present invention.

First, FIG. 4 is a functional block diagram of a contact-less charger system in accordance of a preferred embodiment of the present invention.

Referring to FIG. 4, the contact-less charger system in accordance of this exemplary embodiment includes a power supply 100 and a battery device 200.

The power supply 100 has a sending coil array 110, a rectifier 152, a power distribution circuit 153, a coil driving circuit 154, a control circuit 155, a charging mode controlling circuit 156, and wireless receiving modules 157 and 158.

The sending coil array 110 includes at least one sending coils ($TC_1$, $TC_2$ ... $TC_n$) and the sending coils ($TC_1$, $TC_2$ ... $TC_n$) are preferably formed in a matrix pattern as shown in FIGS. 2 and 3.

The rectifier 152 rectifies alternating current voltage of a commercial alternating current power (60 Hz, 220V) 151 to direct current voltage and transmits the direct current voltage to the power distribution circuit 153.

The power distribution circuit 153 transmits the direct current voltage rectified by the rectifier 152 to the selected coil driving circuit 154. That is, the power distribution circuit 153 receives a selection command from the control circuit 155 and transmits the rectified direct current voltage to the coil driving circuit 154 instructed by the selection command. For example, the power distribution circuit 153 is a kind of switching circuit located between the rectifier 152 and the coil driving circuit 154, and electrically connects the coil driving circuit 154 selected by the control circuit 155 to the rectifier 152.

The charging mode controlling circuit 156 controls the coil driving circuit 154 selected by the control circuit 155 to control the driving mode of the corresponding sending coil 110. For example, the driving mode includes waiting mode, charging mode and buffer mode.

Figure 5:
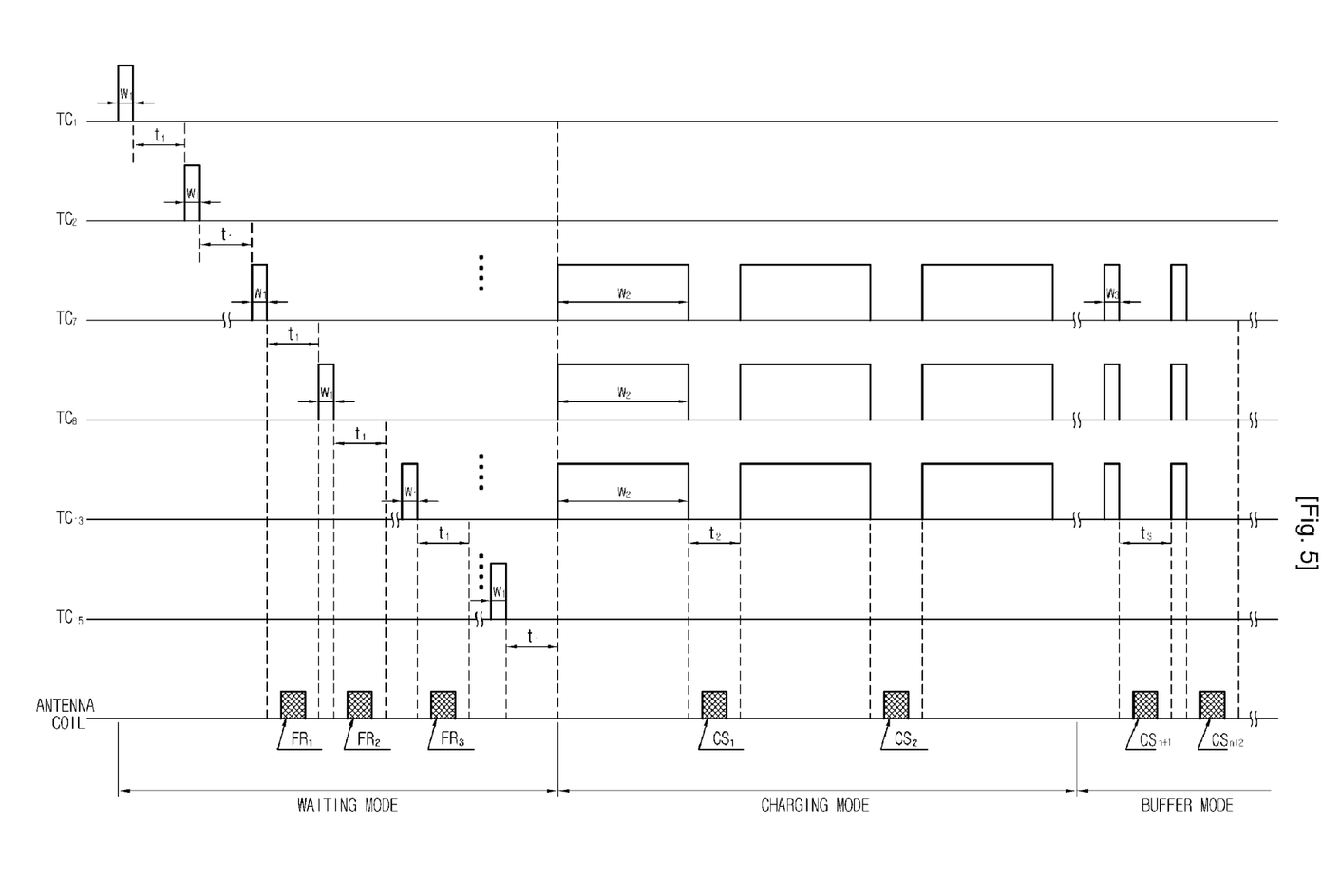
FIG. 5 is a timing chart illustrating the relation between the sequential driving of a sending coil and a feedback response signal in accordance with an exemplary embodiment of the present invention.

Referring to FIG. 5, the waiting mode is for checking the coupling state between a primary coil and a secondary coil, and for example, is a mode at which the primary coil is driven during 50 msec ($w_1$) and stopped during 1 sec ($t_1$). The charging mode is a mode at which the primary coil is driven during longer time ($w_2$) than in the waiting mode of the primary coil conformable in position to the secondary coil thereby to charge the battery device. And, the buffer mode is a mode at which the driving time ($w_3$) of the primary coil is reduced for reducing power consumption, when the battery device is fully charged.

Although the present invention shows that the driving mode of the sending coil includes waiting mode, charging mode and buffer mode as shown in FIG. 5, the present invention is not limited in this regard.

The coil driving circuit 154 converts direct current voltage from the rectifier into alternating current voltage having uniform level and frequency (for example, 80 kHz) to individually drive a plurality of the sending coils. Particularly, the coil driving circuit 154 of this exemplary embodiment generates a predetermined alternating current pulse voltage by each mode (for example, a waiting mode, a charging mode and a buffer mode) as shown in FIG. 5 according to control of the charging mode controlling circuit 156.

The wireless receiving modules 157 and 158 include an antenna coil 158 and a receiving circuit 157, and wirelessly receive charging start signals ($FR_1$, $FR_2$ and so on) and charging state signals ($CS_1$, $CS_2$ and so on) fed back from the battery device 200, and demodulates and charging state signals and transmits them to the control circuit 155.

The control circuit 155 receives a feedback signal of the battery device 200 from the receiving circuit 157, analyzes the feedback signal and controls the power distribution circuit 153 and the charging mode controlling circuit 156. Particularly, the control circuit 155 is preferably connected to a pulse generator (not shown) and a timer (not shown). That is, the timer counts the pulse transmitted from the pulse generator and transmits the counted value to the control circuit 155. Thus, the control circuit 155 sequentially drives the coil driving circuit 154 by controlling the power distribution circuit 153 according to a predetermined cycle ($T=w_1+t_1$).

That is to say, the control circuit 155 sequentially drives the coil driving circuit 154 according to a predetermined time ($w_1$, $t_1$), receives the feedback signal from the battery device 200 and selects the sending coils ($TC_1$, $TC_2$ ... $TC_n$) to be converted into a charging mode.

The battery device 200 has a secondary coil 210, a rectifier 251, a constant-voltage/constant-current circuit 252, a charging state detection circuit 253, a control circuit 255, and wireless sending modules 220 and 256.

The secondary coil 210 is a receiving coil magnetically connected to the primary coil (or the sending coil) for generating induced electromotive force. A power signal applied to the primary coil 110 is a pulse train signal (a pulse having a width of $w_1$) shown in FIG. 5, and thus induced electromotive force induced to the secondary coil 210 also becomes an alternating current pulse train. And, the alternating current voltage pulse induced to the secondary coil 210 also complies with any one of waiting mode, charging mode and buffer mode according to the driving mode of the primary coil 100, as shown in FIG. 5.

The rectifier 251 is connected to an output terminal of the secondary coil 210, and planarizes the alternating current voltage pulse induced by the secondary coil 210 to a predetermined level of direct current voltage.

The constant-voltage/constant-current circuit 252 generates constant-voltage and constant-current to be charged to a battery using a predetermined level of the direct current voltage. That is, the constant-voltage/constant-current circuit 252 maintains a constant-current mode at the initial charging point of the battery, and when the charging voltage of the battery is saturated, the constant-voltage/constant-current circuit 252 converts the constant-current mode into a constant-voltage mode.

The charging state detection circuit 253 detects the charging state, such as the electrical state induced to the output terminal of the secondary coil, the electrical state of the output terminal of the rectifier or voltage at the opposite ends of the constant-voltage/constant-current circuit. The detected charging state detection signal is input into the control circuit 255.

The control circuit 255 is a kind of microprocessor, and receives a monitoring signal such as the charging state detection signal and controls the constant-voltage/constant-current circuit 252 and the wireless sending modules 220 and 256 based on the monitoring signal.

That is to say, the control circuit 255 checks whether or not the primary coil is coupled to the secondary coil, the positional relationship between the primary coil and the secondary coil, the charging state of the battery (constant-current mode, constant-voltage mode or the charging extent) and the voltage state of the opposite ends of the constant-voltage/constant-current circuit based on the charging state detection signal input from the charging state detection circuit 253. Particularly, the control circuit 255 checks a drop point of the alternating voltage pulse induced to the secondary coil, and synchronizes a transmission point of the feedback response signal to be transmitted to the power supply 100 with the drop point of the pulse.

And, in case a minimum level of current capable of driving the control circuit 255 exists at the output terminal of the secondary coil 210, the control circuit 255 feeds back the charging start signals ($FR_1$, $FR_2$ and so on) (See FIG. 5) to the power supply 100. Accordingly, the control circuit 155 of the power supply 100 determines that at least a portion of the currently driving sending coil 110 is coupled to the secondary coil 210, and temporarily stores information in an internal memory (not shown).

And, the control circuit 255 of the secondary battery device monitors the charging current and the charging voltage of the battery 262 at any time, and temporarily stores the monitoring value in the internal memory (not shown). The memory not shown in the drawing stores specification information (for example, product code, rating and so on) of the battery as well as the charging state information of the battery such as the monitored charging current and charging voltage.

And, the control circuit 255 appropriately selects and converts the constant-voltage mode and the constant-current mode according to the charging state of the battery.

The wireless sending modules 256 and 220 includes an antenna 220 for sending the feedback response signal (for example, the charging start signal or the charging state signal) to be transmitted to the power supply 100, and a sending circuit 256 for modulating a baseband signal such as the charging state information to generate the feedback response signal.

A protection circuit (PCM; Pulse Code Modulation) 261 is arranged between the constant-voltage/constant-current circuit 252 and the battery 262 to prevent excessive voltage or current from being applied to the battery. The protection circuit 261 and the battery 262 forms a single battery unit 260.

The functional configuration of the above-mentioned contact-less charger system in FIG. 4 is just one exemplary embodiment for describing the principle of the present invention, and various modifications will be apparent within the range of not spoiling the technical principle of the present invention.

Figure 6:
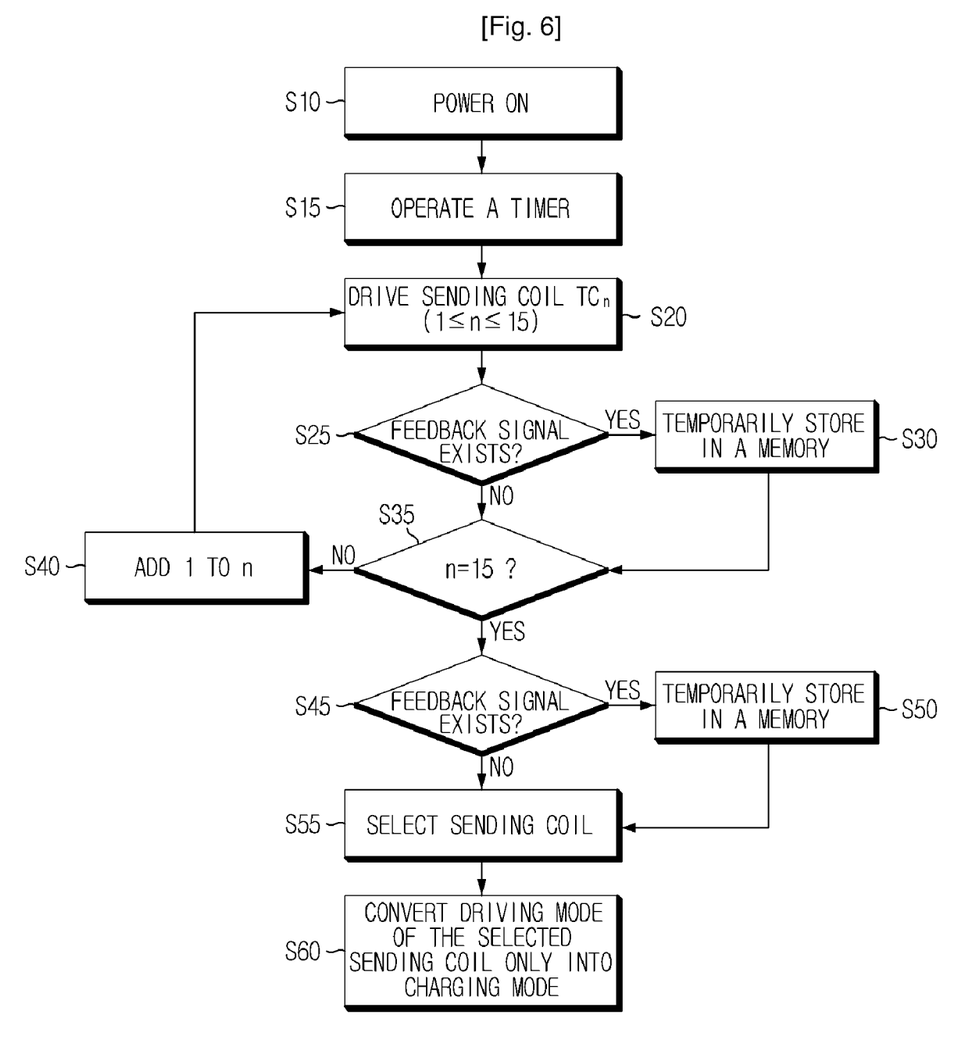
FIG. 6 is a flowchart illustrating a contact-less charging method in accordance with an exemplary embodiment of the present invention.

Next, operation of the contact-less charger system in accordance with a preferred embodiment of the present invention is described with reference to FIGS. 5 and 6.

First of all, for the convenience of description, assuming that the power supply 100 of this exemplary embodiment has a coil array structure (i.e. fifteen primary coils are formed within an antenna coil in a matrix pattern) as shown in FIG. 2a, and the battery device (for example, a cellular phone) is arranged on the power supply 100 as shown in FIG. 2a. That is, assuming that the battery device 200 is arranged over the sending coils #7, #8, #9, #12, #13 and #14 among the sending coils of the power supply 100 as shown in FIG. 2a.

When the external power such as the commercial alternating current power 151 is applied to the power supply 100, the control circuit 155 of the power supply wakes up, and controls the power distribution circuit 153 and the coil driving circuit 154 to sequentially drive the sending coils 110 (S10). At this time, the timer counts a pre-determined pulse input from the pulse generator not shown in the drawing and inputs the count information into the control circuit (S15).

First, the control circuit 155 controls the power distribution circuit 153 to apply the direct current voltage rectified by the rectifier 152 to the coil driving circuit #1 154 during a predetermined time ($w_1$). That is, as shown in FIG. 5, the control circuit 155 drives the coil driving circuit #1 154 to drive the sending coil $TC_1$ during the time $w_1$ (for example, 50 msec) and alert the sending coil $TC_1$ during the time t (for example, 1 sec) (S20). At this time, the control circuit 155 determines whether or not the feedback response signal (a charging start signal) exists from the secondary battery device 200 within the time $t_1$ (S25).

In case any response is not received from the secondary battery device 200, the control circuit 155 determines that the secondary coil coupled to the sending coil $TC_1$ does not exist, and controls the power distribution circuit 153 to drive the coil driving circuit #2 154. That is, the control circuit 155 determines whether or not the number n of the sending coil (or the coil driving circuit) reaches 15 (S35), and in case the number (n) of the sending coil does not reach 15, the control circuit adds 1 to the value of n (S40). Accordingly, a selection signal output from the control circuit 155 instructs the coil driving circuit #2 154 and thus the coil driving circuit #2 154 is driven in the same manner as the step S20.

Meanwhile, in case the feedback response signal exists from the battery device 200 in the step S25, the control circuit determines that there exists the secondary coil 210 of which at least a portion is coupled to the sending coil $TC_1$, temporarily stores the number (#1) of the corresponding sending coil in the internal memory and performs the step S35 (S30).

In this exemplary embodiment, as shown in FIG. 2, the sending coil $TC_1$ to the sending coil $TC_6$ are not magnetically coupled to the secondary coil. Thus, as shown in FIG. 5, during operation of the sending coil $TC_1$ to the sending coil $TC_6$, any feedback response signal is not received to the antenna coil 158. However, the sending coils $TC_7$, $TC_8$, $TC_{12}$ and $TC_{13}$ are magnetically coupled to the secondary coil 210 of the battery device 200. Thus, the induced electromotive force occurs to the secondary coil 210 of the battery device, and the control circuit 255 of the battery device is driven by the induced electromotive force. Meanwhile, the induced electromotive force occurred to the output terminal of the secondary coil 210 is also converted into direct current pulse as shown in FIG. 5, and the charging state detection circuit 253 detects the drop point of the direct current pulse and reports the drop point of the direct current pulse to the control circuit 255. Accordingly, the control circuit 255 transmits the feedback response signals ($FR_1$, $FR_2$, $FR_3$ and so on) to the wireless receiving modules 157 and 158 of the power supply 100 through the wireless sending modules 220 and 256. FIG. 5 shows that the feedback response signal of each of $FR_1$, $FR_2$ and $FR_3$ is received to the antenna coil 158 of the power supply during the waiting time ($t_1$) of the sending coils $TC_7$, $TC_8$ and $TC_{13}$.

The sending coil $TC_{14}$ is physically coupled to the battery device, but it is not magnetically coupled to the secondary coil 210. Thus, although the sending coil $TC_{14}$ operates in the state of waiting mode, the feedback response signal is not received to the antenna coil. And, a portion of the sending coil $TC_{12}$ is magnetically coupled to the secondary coil 210, but voltage induced to the secondary coil is inevitably very low due to the positional offset. Accordingly, although the induced electromotive force is generated, the induced electromotive force cannot drive the control circuit 255 of the battery device, and thus the feedback response signal is not received to the antenna coil.

As such, the control circuit 255 waits for the feedback response signal from the battery device 200 while sequentially driving the sending coils $TC_1$ to $TC_{14}$. At this time, when the feedback response signal is received during operation of a specific sending coil, the control circuit 255 temporarily stores the number (#) of the corresponding sending coil in the internal memory.

Meanwhile, in case the value of n is 15 in the above step S35, the control circuit performs the step S45 to wait for the feedback response signal. At this time, in case the feedback response signal exists, the control circuit temporarily stores the number #15 of the corresponding sending coil in the internal memory in the same manner of the step S30 (S50), and in case the feedback response signal does not exist, the control circuit stops the waiting mode and converts into a charging mode.

That is to say, the control circuit 155 retrieves the internal memory, reads the numbers #7, #8 and #13 of the sending coils temporarily stored in the internal memory, controls the power distribution circuit 153 and the charging mode controlling circuit 156 based on the reading result thereby to convert the sending coils $TC_7$, $TC_8$ and $TC_{13}$ into a charging mode and stop the operation of the other sending coils (S55 and S60).

Accordingly, a driving pulse having a width w is applied to the sending coils ($TC_7$, $TC_8$ and $TC_{13}$) and the corresponding charging power pulse is induced to the secondary coil 210 magnetically coupled to the sending coils. The induced charging power is converted into direct current through the rectifier 251 and is charged to the battery 262 through the constant-voltage/constant-current circuit 252. At this time, the charging state detection circuit 253 detects the charging current and charging voltage applied to the battery 262 and transmits the charging current and charging voltage to the control circuit 255. The control circuit 255 feeds back the charging state signals ($CS_1$, $CS_2$ and so on) shown in FIG. 5 to the power supply 100 at the drop point of the charging power pulse.

The control circuit 155 of the power supply fed back with the charging state signals ($CS_1$, $CS_2$ and so on) from the battery device 200 controls the driving level of the sending coils ($TC_7$, $TC_8$ and $TC_{13}$) in conformity with the charging state of the battery. And, when the battery is fully charged during the charging mode, the control circuit 155 controls the charging mode controlling circuit 156 to convert the driving mode of the sending coils ($TC_7$, $TC_8$ and $TC_{13}$) into the buffer mode as shown in FIG. 5. The pulse width ($w_3$) of the driving pulse of buffer mode is smaller than the pulse width ($w_2$) of the driving pulse of charging mode and is similar to the pulse width ($w_1$) of the driving pulse of waiting mode.

As described above, the contact-less charger system of the present invention does not drive all of the sending coils of the sending coil array, but instead drives only a sending coil magnetically coupled to the receiving coil of the battery device, and thus the contact-less charger system is capable of remarkably reducing energy consumption compared with a conventional system. And, to detect the sending coil magnetically coupled to the receiving coil of the battery device, the present invention operates a preliminary waiting mode having relatively lower power consumption than the charging mode. Further, a plurality of the sending coils are included in the sending coil array, and thus the present invention is capable of simultaneously charging a plurality of the battery devices.

Although the above-mentioned embodiment of the present invention shows the power distribution circuit 153 arranged between the rectifier 152 and the coil driving circuit 154, the power distribution circuit 153 may be arranged between a single coil driving circuit and a plurality of the sending coils.

Further, Although the exemplary embodiment of the present invention shows the pulse width modulation used in controlling the driving level of the sending coil, other methods such as frequency modulation may be applied.

Although the exemplary embodiment shown in FIG. 4 shows a single antenna coil 120 surrounding the whole of the coil array, antenna coils may be individually arranged to each of the sending coils ($TC_1$, $TC_2 \sim TC_n$).

Figure 7:
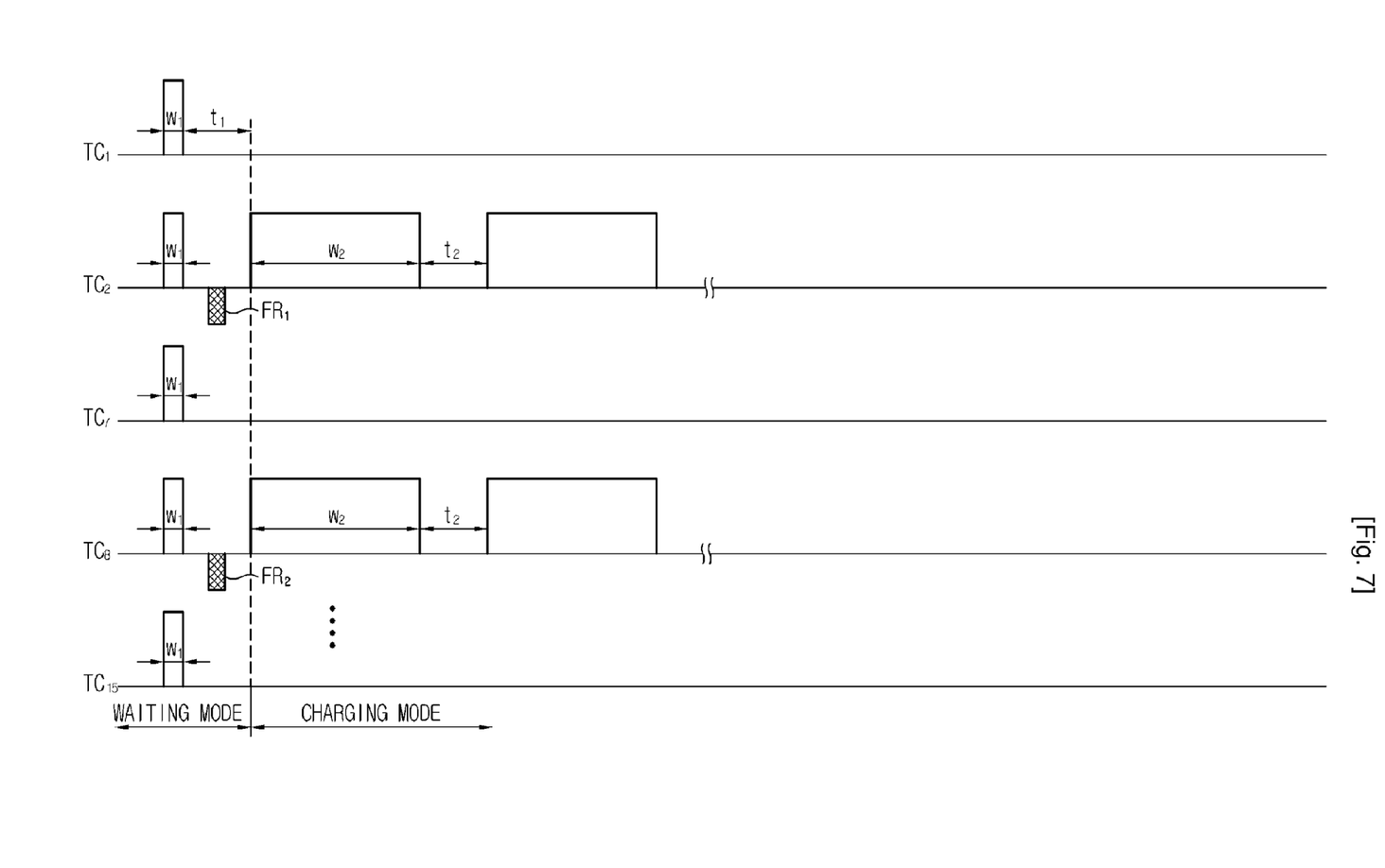
FIG. 7 is a timing chart illustrating the relation between the simultaneous driving of a sending coil and a feedback response signal in accordance with another exemplary embodiment of the present invention.

As such, if the sending coil and the antenna coil is formed integrally into a coil block, there is no need to find the sending coil coupled to the secondary coil while sequentially driving the sending coils as shown in FIG. 5. That is, as shown in FIG. 7, it is possible to simultaneously drive all of the sending coils and receive only the sending coil magnetically coupled to the secondary coil. In this case, different frequencies or different codes may be used to distinguish feedback signals received to different antenna coils.

Figure 8:
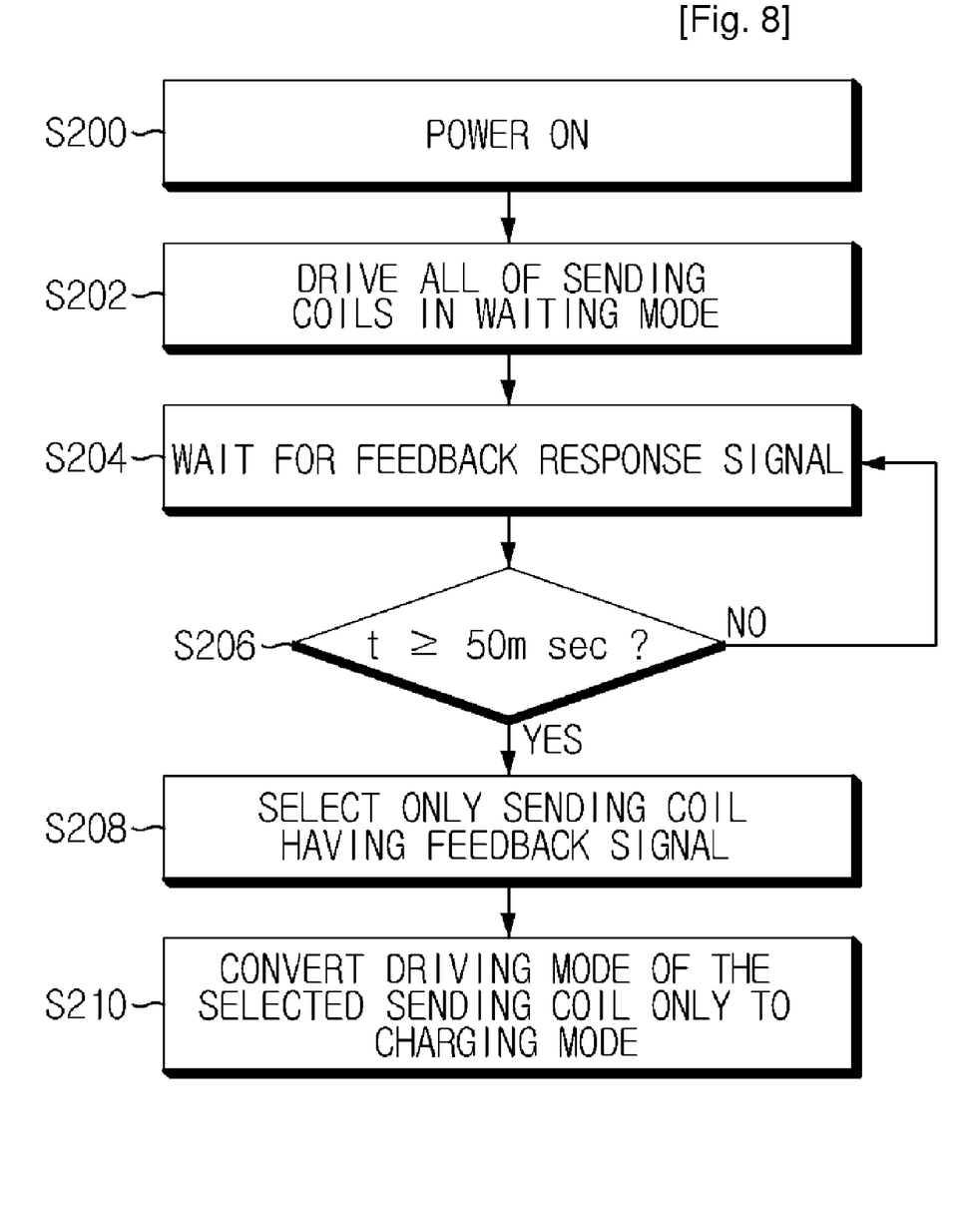
FIG. 8 is a flowchart illustrating a contact-less charging method in accordance with another exemplary embodiment of the present invention.

Another embodiment of the present invention is described in detail with reference to FIGS. 7 and 8.

When the external power 151 is applied to the power supply 100 (S200), the control circuit 155 controls the power distribution circuit 153 and the charging mode controlling circuit 156 to simultaneously drive all of the sending coils ($TC_1 \sim TC_{15}$) of the sending coil array 110 in the waiting mode (S202).

The magnetic field generated from the sending coils ($TC_1 \sim TC_{15}$) is radiated to the external environment, and induced electromotive force occurs to the output terminal of the secondary coil 210 by the magnetic field generated from the sending coils (for example, $TC_2$ and $TC_8$) magnetically coupled to the secondary coil 210. At this time, signals emitted from the sending coils ($TC_1 \sim TC_{15}$) should have different frequencies or different codes so that the battery device 200 distinguishes the sending coils ($TC_1 \sim TC_{15}$).

The battery device 200 analyzes the waiting mode power pulse induced to the output terminal of the secondary coil 210, determines the number (#) of the sending coils having generated the induced electromotive force, and transmits the number information as a feedback response signal to the power supply 100.

At this time, after the control circuit 155 of the power supply drives the sending coils ($TC_1 \sim TC_{15}$) in the waiting mode, the control circuit waits for the feedback response signal and determines whether the time required to receive the feedback response signal exceeds a predetermined time (for example, 50 msec) (S204 and S206).

At this time, when the feedback response signal is received from the battery device 200 within a predetermined time, the control circuit analyzes the response signal, and selects the sending coil (for example, $TC_2$ and $TC_8$) magnetically coupled (or conformable in position) to the secondary coil 210 (S208).

The control circuit 155 converts the driving mode of the sending coils (for example, $TC_2$ and $TC_8$) selected in the above step S208 from the waiting mode to the charging mode by controlling the power distribution circuit 153 and the charging mode controlling circuit 156 (S210).

As described above, the present invention simultaneously drives all of the sending coils of the sending coil array, and thus the time required to operate at the waiting mode is reduced thereby to reduce unnecessary power consumption.

Hereinabove, preferred embodiments of the present invention has been described in detail with reference to the accompanying drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

As described above, a plurality of the sending coils are formed on the charging pad in a matrix pattern, and thus the present invention prevents the positional offset with the secondary coils and is capable of simultaneously charging a plurality of portable electronic equipments in a contact-less manner.

Further, the present invention is capable of selectively driving only the primary coil conformable in position to the secondary coils of portable electronic equipments, thereby remarkably reducing waste of energy.

The invention claimed is:

1. A contact-less power supply magnetically coupled to a battery device having a receiving coil therein, for contact-less charging the battery device, the contact-less power supply comprising:

a coil array including a plurality of sending coils for inducing a charging power to the receiving coil; and a driving means for detecting a sending coil magnetically coupled to the receiving coil and selectively driving only the detected sending coil, wherein the driving means sequentially drives any one of the sending coils, and in case a feedback response from the battery device exists, temporarily stores in an internal memory identification information of the corresponding sending coil having the feedback response, and then reads all the identification information temporarily stored in the internal memory, and selectively supplies the charging power to the detected sending coil only.

2. A charging power supply system magnetically coupled to a battery device including a secondary coil for inductive coupling, a wireless sending module for wirelessly sending data, a charge controlling circuit for controlling the charging state of the battery device, and a rechargeable battery, the charging power supply system comprising:

a primary coil array including a plurality of primary coils for inducing a charging power to the secondary coil;

a rectifier circuit for converting an external alternating current voltage into direct current voltage;

a coil driving circuit for generating a driving power for driving the plurality of primary coils based on the direct current voltage;

a wireless receiving module for receiving a feedback signal from the wireless sending module; and a drive controlling circuit for controlling the coil driving circuit, wherein the drive controlling circuit preliminarily drives any one of the plurality of primary coils, and in case a feedback response from the battery device exists, temporarily stores in an internal memory identification information of the corresponding primary coil having the feedback response, and then reads all the identification information temporarily stored in the internal memory, and selectively generates the driving power to the corresponding primary coil only.

3. The charging power supply system of claim 2, wherein the plurality of primary coils are arranged in a matrix pattern.

4. The charging power supply system of claim 2, wherein the plurality of primary coils are arranged in a zigzag pattern.

5. A charging method for charging a battery in a contact-less charger system composed of a power supply including a primary coil array having a plurality of primary coils and a wireless receiving module, and a battery device including a secondary coil magnetically coupled to the primary coil, a wireless sending module and a rechargeable battery, the charging method comprising:

(A) selecting any one of the primary coils and preliminarily driving the selected primary coil during a relatively short time;

(B) waiting for a feedback response from the battery device during a predetermined time;

(C) in case the feedback response exists, temporarily storing identification information of the corresponding primary coil in an internal memory;

(D) selecting another primary coil from the primary coil array and repetitively performing the steps (A) to (C);

(E) sequentially performing the step (D) on all of the primary coils of the primary coil array; and (F) reading the identification information of the primary coil from the internal memory and selectively supplying a charging power to the corresponding primary coil only.

6. A contact-less charger system comprising:

a first charging unit including a wireless receiving module and a primary coil array having a plurality of primary coils;

a second charging unit including a secondary coil magnetically coupled to the plurality of primary coils and a wireless sending module, wherein the plurality of primary coils are configured to induce a charging power to the secondary coil; and a battery supplied with the charging power from the second charging unit, wherein the first charging unit further includes:
a first means for selecting only the primary coil having a feedback response from the second charging unit after driving the plurality of primary coils in a waiting mode, and driving only the selected primary coil in a charging mode, and wherein the second charging unit further includes:
a second means for generating a feedback signal informing the charging start in case that a power sufficient to drive an internal circuit is induced to the secondary coil, and transmitting the feedback signal to the first charging unit, wherein the first means preliminarily drives any one of the primary coils, and in case the feedback response from the second charging unit exists, temporarily stores identification information of the corresponding primary coil having the feedback response, and then selects only the corresponding primary coil having the feedback response by reading all the identification information temporarily stored, and selectively drives only the selected primary coil, whereby, among the plurality of primary coils of the primary coil array, only the primary coil conformable in position to the secondary coil is selectively driven.

* * * * *